United States Patent [19]

Kitterman

[11] 3,992,069

[45] Nov. 16, 1976

[54] FOOD TRAY CARRIER

[76] Inventor: Gary Kitterman, 4100 Riverside St., Kansas City, Mo. 64150

[22] Filed: June 23, 1975

[21] Appl. No.: 589,454

[52] U.S. Cl................................ 312/244; 312/236; 312/320
[51] Int. Cl.² ........................................ A47B 95/02
[58] Field of Search.................... 312/244, 236, 320

[56] References Cited
UNITED STATES PATENTS

| 1,223,455 | 4/1917 | Weiss................................ | 312/320 |
| 2,309,882 | 2/1943 | Bescherer......................... | 312/320 |
| 2,311,664 | 2/1943 | Johnson............................ | 312/244 |
| 2,505,898 | 5/1950 | Jaffe et al. ........................ | 312/244 |
| 2,807,387 | 9/1957 | Siciliano .......................... | 312/244 |
| 2,821,425 | 1/1958 | Vogt................................. | 312/320 |
| 3,104,131 | 9/1963 | Krone ............................... | 312/244 |
| 3,219,400 | 11/1965 | Bergquist......................... | 312/244 |
| 3,481,066 | 12/1969 | Woolworth...................... | 312/244 |
| 3,908,749 | 9/1975 | Williams........................... | 312/236 |
| D206,481 | 12/1966 | Mackay ............................ | 312/236 |

FOREIGN PATENTS OR APPLICATIONS

| 1,271,219 | 7/1961 | France.............................. | 312/236 |
| 865,949 | 2/1953 | Germany.......................... | 312/236 |

Primary Examiner—Paul R. Gilliam
Assistant Examiner—Victor N. Sakran
Attorney, Agent, or Firm—Fishburn, Gold & Litman

[57] ABSTRACT

A food tray carrier particularly adapted for use by catering services and the like for moving a plurality of trays containing prepared food from a place of preparation to a place for service or further preparation, as for example, on an airplane for serving passengers, comprises an open front housing having a plurality of elongated tray supporting ribs integral with and extending inwardly from opposite side walls of the housing and door opening frame members and stiffeners are mounted on forwardly facing edge portions of housing walls. A closure member is hingedly mounted on the housing for selectively closing the open front of the housing with the closure member, mounting and housing cooperating to form a strong durable structure that is of light weight for portability. The closure member has walls on an inwardly facing surface thereof defining an open top compartment for receiving refrigeration material therein.

5 Claims, 6 Drawing Figures

FOOD TRAY CARRIER

The present invention relates to food tray carriers and more particularly to a food tray carrier in the form of a closed container for protecting food for transportation as on to airplanes for food service to passengers.

The principal objects of the present invention are: to provide a food tray carrier particularly adapted for use by catering services and the like for moving a plurality of trays containing prepared food from a place of preparation to a place for service or further preparation as on to airplanes for food service to passengers; to provide such a carrier which is light in weight and easily cleaned; to provide such a carrier having an open front housing formed of integral rear, side, bottom, and top walls with framing members on facing edges of said walls; to provide such a carrier in which the open front is selectively closed by a closure member having flange portions extending from peripheral edges thereof to be in facing relation with said framing members; to provide such a carrier having tray supporting ribs on opposite side walls formed by inwardly extending recesses in the opposite side walls whereby the ribs are integral with the housing; to provide such a carrier wherein the housing has supporting projections depending from the bottom wall of the housing and formed by recesses in the bottom wall whereby the projections are integral therewith; to provide such a food tray carrier having walls on an inwardly facing surface on the closure member thereby defining an open top compartment for receiving refrigeration material therein; and to provide such a food tray carrier which is economical to manufacture, durable in construction, light in weight, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the food tray carrier.

Figure 1:
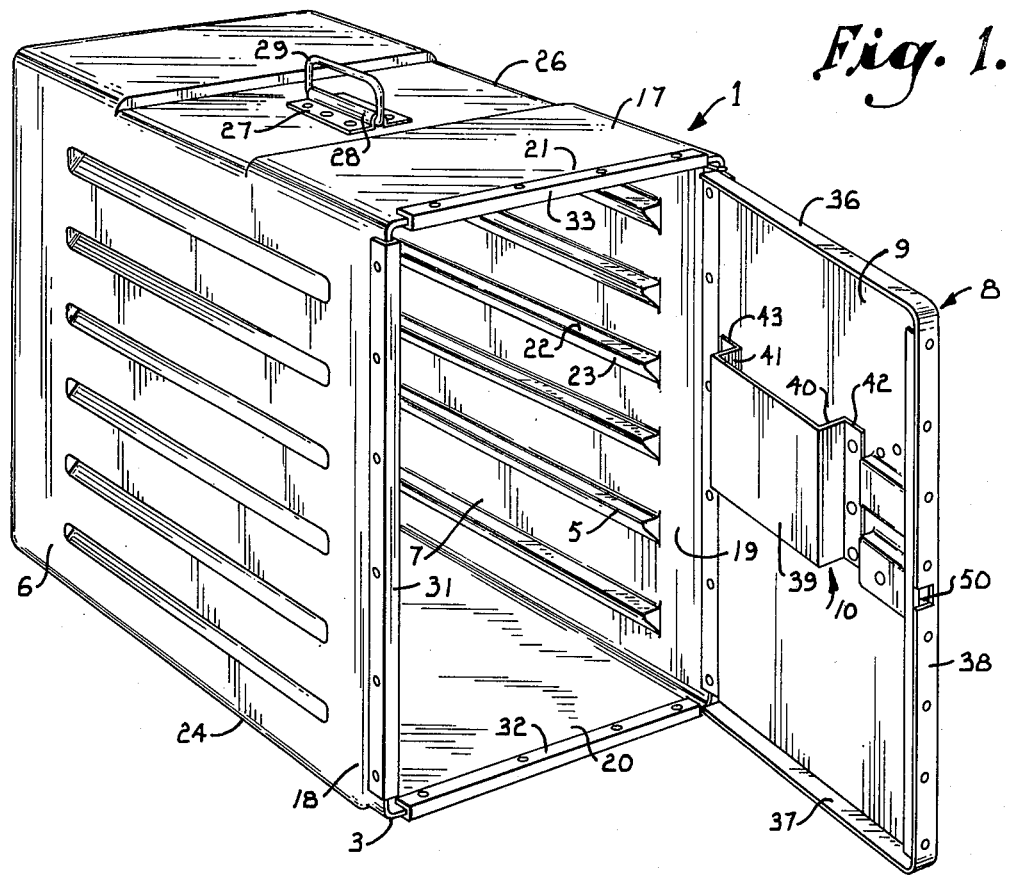
FIG. 1 is a perspective view of a food tray carrier embodying features of the present invention and shown with a closure member in an open position.
Figure 2:
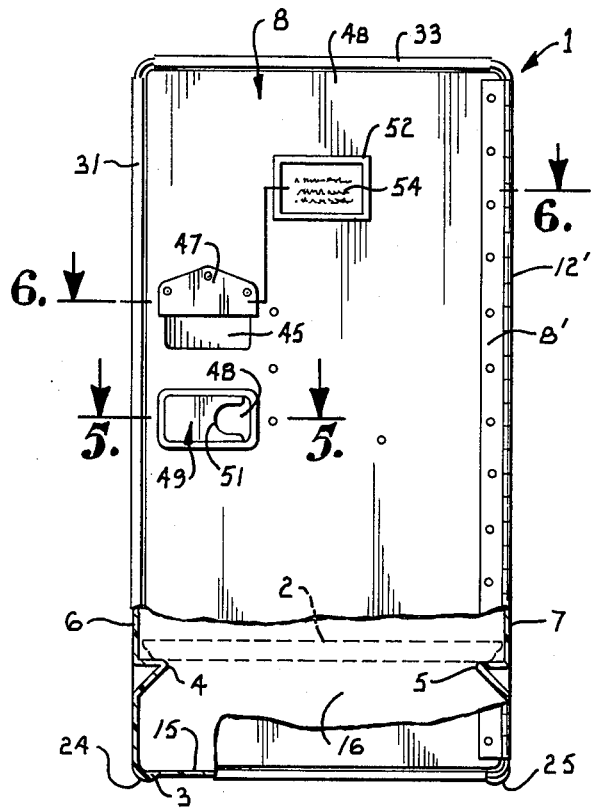
FIG. 2 is a front elevational view of the food tray carrier with portions broken away to show construction thereof.
Figure 3:
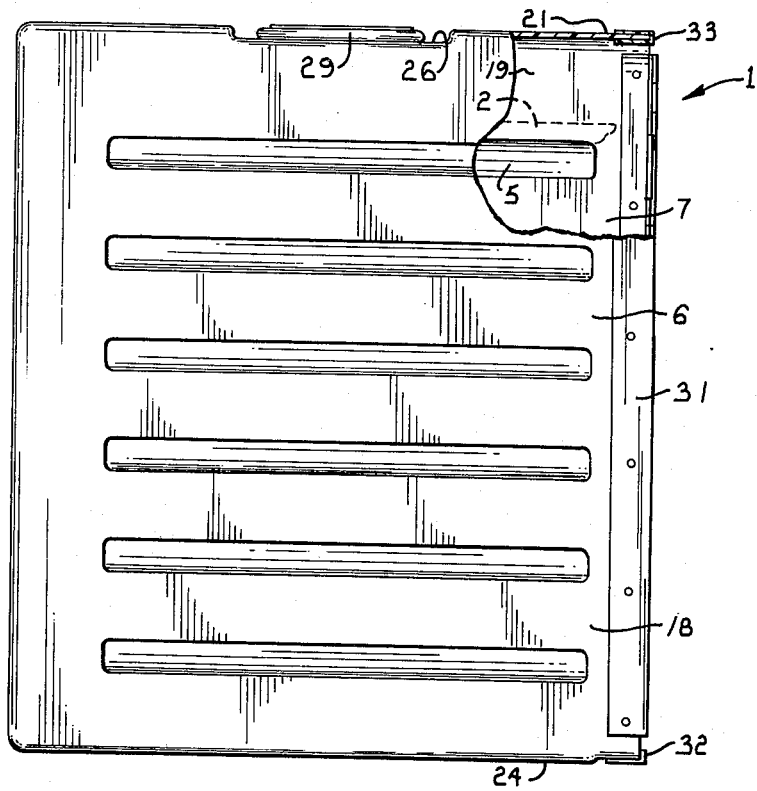
FIG. 3 is a side elevational view of the food tray carrier with portions broken away to show the construction thereof.
Figure 4:
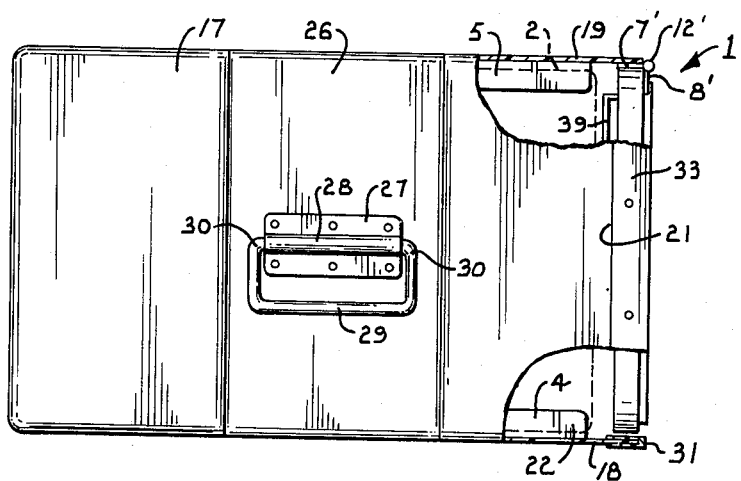
FIG. 4 is a top plan view of the food tray carrier with portions broken away to show the construction thereof.
Figure 5:
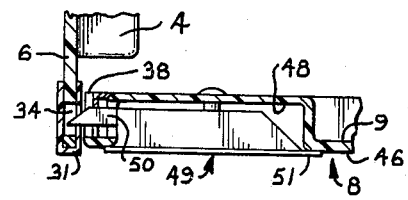
FIG. 5 is a transverse sectional view taken on line 5—5 of FIG. 2 and showing latch means for holding the closure member in the closed position.
Figure 6:
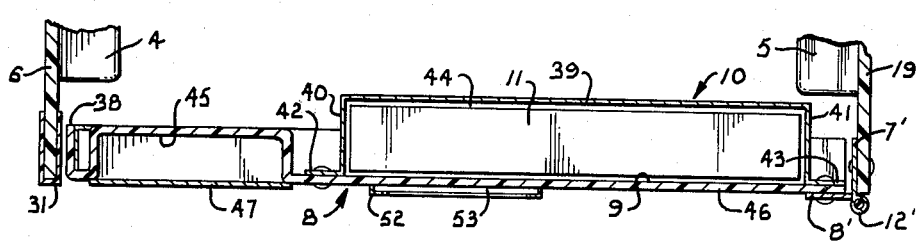
FIG. 6 is a fragmentary transverse sectional view taken on line 6—6 of FIG. 2 and showing handle means on the closure member.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 designates generally a food tray carrier particularly adapted for use by catering services and the like for moving a plurality of trays 2 containing prepared food from a place of preparation to a place for service or further preparation, as for example, on to an airplane for serving passengers. The food tray carrier 1 comprises an open front housing 3 having a plurality of elongated tray supporting ribs 4 and 5 extending inwardly from and integral with opposite side walls 6 and 7 of the housing 3. A closure member 8 is hingedly mounted on the housing 3 for selectively closing the open front of the housing 3. The closure member 8 has walls on an inwardly facing service 9 thereof defining an open top compartment 10 for receiving refrigeration material 11 therein to aid in preserving food, particularly for use with preprepared meals to be placed on airplanes and heated in radar ovens or other heating devices for hot food service to passengers.

The housing 3 is an integral structure formed of molded plastic or similar material that is strong and resists impacts, abrasion, and the like. The housing 3 includes a bottom wall 15 with the side walls 6 and 7 and a rear wall 16 extending upwardly therefrom and a top wall 17 connecting upper edges of the side walls 6 and 7 and the rear wall 16 thereby defining an integral open front sheel or housing in which the side walls 6 and 7 have forwardly facing edge portions 18 and 19 respectively and the bottom and top walls 15 and 17 have forwardly facing edge portions 20 and 21 respectively.

The ribs 4 and 5 are on and integral with the side walls 6 and 7 and are preferably formed by the side walls extending inwardly so the ribs are hollow and the walls forming the ribs are substantially the same thickness as the thickness of the respective side wall. This forms an outwardly facing recess for each rib and strong rigid side walls and ribs that are light in weight. The ribs 4 and 5 are arranged in vertical spaced and aligned pairs to define supports for respective peripheral side edges of the food trays 2. The ribs 4 and 5 each have a generally level or horizontal ledge portion 22 and a downwardly inclined portion 23.

The bottom wall 15 has means thereon engageble with a support surface for supporting the housing 3 on any support surface, such as a floor or the top wall 17 of a like tray carrier. In the illustrated embodiment a pair of elongated projections or runners 24 and 25 depend from the bottom wall 15. The illustrated projections or runners 24 and 25 are substantially parallel with the side walls 6 and 7 and are formed by the bottom wall 15 extending or being depressed downwardly as the runners are integral with the bottom wall and the walls forming the runners are substantially the same thickness as the adjacent bottom wall portions with each runner having an upwardly opening recess therein.

The top wall 17 has a depressed portion or recess 26 therein and positioned between the rear wall 16 and the forwardly facing edge portion 21 of the top wall 17. The recess 26 extends between the opposite side walls 6 and 7 and is substantially parallel with the forwardly facing edge 21 of the top wall 17.

A handle retainer 27 is mounted on the top wall 17 and positioned in the recess 26 and is preferably positioned on the center line of the food tray carrier 1, the illustrated retainer 27 being a generally planar member having a raised handle receiving portion 28.

A C-shaped handle 29 has each of oppposite end portions 30 thereof pivotally received in the raised handle receiving portion 28 of the handle retainer 27 whereby the handle 29 is movable between a generally upstanding position for use in carrying the food tray carrier 1 and a generally horizontal position for storage in the recess 27 in which the handle is even with or below the upper surface of the top wall 17.

The handle receiving portion 28 may extend slightly above an upper surface of the top wall 17 whereby the bottom wall 15 of a like food tray carrier 1 during stacking would engage same. However, the projections 24 and 25 depending from the bottom wall 15 engage an upper surface of the top wall 17 of the lower tray carrier 1 and thereby provide clearance between the bottom wall 15 of the upper carrier 1 and the handle receiving portion 28 of the lower food tray carrier.

Framing members 31, 32, and 33 are mounted on the forwardly facing edge portions 18, 20, and 21 of the one side wall 6, bottom wall 15, and top wall 17 and suitably secured thereto by a plurality of spaced fastenings, such as rivets 33' extending through aligned apertures in the framing members and housing walls. In the illustrated structure, the framing members 31, 32, and 33 are each generally U-shaped and each have a web portion engaging the respective forwardly facing edge and spaced flange portions engaging interior and exterior surfaces of the respective housing wall to thereby provide stiffness to the respective edge portions and a finished appearance thereto. The framing members are adapted to be formed by extrusion process and preferably are of metal, such as aluminum, or the like, for strength, stiffness and light weight.

The flange portions of the framing members 31, 32, and 33 each have a spacing therebetween substantially corresponding to the thickness of the respective forwardly facing edge portions of the housing walls. Facing surfaces of the flange portions of each of the framing members are each in engagement with respective surfaces of the housing walls.

The framing member 31 on the forwardly facing edge portion 18 of the one side wall 6 has a recess 34 in the flange portion engaging the inwardly facing surface of the one side wall 6, for a purpose later described.

The flange portions of the framing member on the forwardly facing edge portion 18 of the one side wall 6 are of a width such that the flange portion on the inwardly facing surface of the one side wall 6 terminates adjacent the forward ends of tray supporting ribs 4 of the one wall 6.

The closure member 8 is hingedly mounted on the other side wall 7 of the housing 3 and the closure member 8 is adapted to close substantially the entire open front of the housing 3. The illustrated closure member 8 is a generally planar member having peripheral side, top, and bottom edges. A top flange portion 36 extends from the top peripheral edge of the closure member 8. A bottom flange portion 37 extends from the bottom peripheral edge of the closure member 8. A side flange portion 38 extends from one peripheral side edge of the closure member 8. The flange portions 36, 37, and 38 are each in facing relation with respective framing members when the closure member 8 is in a closed position.

The flange portions 36, 37, and 38 each have a width substantially equal to the width of the respective flange portion of the adjacent framing member of the housing walls. The flange portions 36, 37, and 38 each have a thickness corresponding to the thickness of planar portion of the closure member 8 to thereby stiffen the edge portions thereof.

The closure member 8 is hingedly mounted on the other side wall 7 of the housing 3. In the illustrated structure, a piano-type hinge 12' has a first leaf 7' thereof secured to the forwardly facing edge portion 19 of the other side wall 7 of the housing 3. The first leaf 7' of the hinge 12' is of a thickness and width substantially equal to the thickness and width of the flange portions of the framing members 31, 32, and 33 to thereby stiffen the edge portion 19 of the other side wall of the housing 3. The first leaf 7' has an inwardly facing edge which is adjacent the forward ends of the tray supporting ribs 5 on the other side wall 7.

The hinge 12' has a second leaf 8' thereby secured to the peripheral edge portion of the closure member 8. The second leaf 8' is of a thickness and width substantially equal to the thickness and width of the first leaf 7' to thereby stiffen the peripheral edge portion of the closure member 8.

The closure member 8 substantially fills the open front of the housing 3 and the first leaf 7' extends substantially the entire distance between the bottom wall 15 and the top wall 17 of the housing 3. The second leaf 8' extends substantially the entire height of the closure member 8 and is of the same height as the first leaf 7' of the hinge 12'.

The open top compartment 10 on the inwardly facing surface 9 of the closure member 8 is adapted to receive refrigeration material therein, such as dry ice. The walls defining the compartment 10 include a rear wall panel 39 positioned in facing relation with the inwardly facing surface 9 of the closure member 8. Opposite side wall panels 40 and 41 extend from and are substantially normal or perpendicular to respective side edges of the rear wall panel 39 and have flange portions 42 and 43 respectively extending laterally therefrom and positioned in engagement with and suitably secured to the inwardly facing surface 9 of the closure member 8. A bottom wall panel 44 extends from and is substantially normal or perpendicular to the rear wall panel 39 and is positioned to close the open top compartment 10.

The closure member 8 is molded to form a first recess 45 in an exterior surface 46 thereof. The first recess 45 is positioned adjacent the side flange portion 38 and intermediate the top and bottom flange portions 36 and 37 respectively. A planar member 47 is mounted on the exterior surface 46 of the closure member 8 and has one edge thereof, such as a lower edge, positioned to permit a hand to enter the recess 45 and grasp the planar member 47 during opening and closing of the closure member 8 thereby defining a handle.

The closure member 8 is molded to form a second recess 48 in the exterior surface 46 thereof, said recess 48 being positioned adjacent the first recess 45. Latch means 49 are mounted in the recess 48 and the latch means 49 has a bolt 50 movable into and out of the recess 34 in the framing member 31. The bolt 50 is adapted to retain the closure member 8 in a position closing the open front of the housing 3 when received in the recess 34. The latch means 49 includes a pivotally mounted handle 51 operatively connected to the bolt 50 for retracting same thereby permitting opening of the closure member 8.

The food tray carrier 1 preferably has means thereon for identifying the contents of the trays 2, destination of the carrier 1, method for handling, or the like. In the illustrated embodiment, a holder 52 is suitably mounted on the closure member 8 and includes a frame portion having an entrance 53 preferably adjacent an upper edge portion of the holder 52. A suitable card or other indicia means 54 is removably mounted in the holder 52, as by being moved through the entrance 53.

In using a food tray carrier constructed as illustrated and described, suitable refrigeration material 11, such as dry ice, is positioned in the open top compartment 10 on the closure member 8. The food trays 2 having prepared food therein are positioned wuithin the housing 3 and having the peripheral edges thereof supported on the elongated ribs 4 and 5 on the side walls 6 and 7 respectively. The closure member 8 is moved to a position closing the open front housing 3 and the bolt 50 moves into the recess 34 in the framing member 31 on the forwardly facing edge portion 18 of the one side wall 6. When it is desired to move the food tray carrier, such as for placing on a truck or movement to a conveyor or the like, the handle 29 is raised and the container 1 is lifted. The containers 1 may be stacked vertically with the elongated projections 24 and 25 of an upper container in engagement with the top wall 17 of a lower container. When it is desired to serve or further prepare the contents in the food trays 2, the closure member 8 is moved to an open position by means of the handle 51 moving the bolt 50 out of the recess 34 and the trays removed as desired.

In use, the carriers are transported in vehicles and handled many times. They are carried by workmen and moved in and out of cabinets or compartments and subjected to impacts, abrasion by sliding, and other wear or damage inducing handling. The carrier is strong yet light to facilitate such handling and provide long life.

It is to be understood that while I have illustrated and described one form of my invention, it is not to be limited to the specific form or arrangement of parts herein described as shown.

What I claim and desired to secure by Letters Patent is:

1. A food tray carrier comprising:
   a. a housing of molded plastic having a bottom wall and opposite side walls and a rear wall and a top wall defining an open front shell, said side walls and said bottom wall and said top wall each having a forwardly facing edge portion;
   b. a plurality of elongated projections integral with and depending from said bottom wall, said projections being substantially parallel with said opposite side walls and defining supports for said housing;
   c. a plurality of elongated ribs integral with and extending inwardly from each of said opposite side walls, said ribs being arranged in vertically spaced and aligned pairs to define supports for peripheral side edges of food trays;
   d. elongate metal framing members mounted on and enclosing certain of said forwardly facing edge portions for substantially the length thereof to protect and strengthen same;
   e. a closure member having a panel with peripheral flanges on certain edge portions for positioning in the open front of said housing in close relation to said framing members to close said open front;
   f. an elongate metal member on each of one of said side walls of the housing and an adjacent edge portion of the closure member panel to strengthen and stiffen same and hinge means connecting said metal members to swingably mount the closure member relative to said housing;
   g. latch means mounted on said closure member and engageable with a framing member on the edge portion of the other of said side walls for retaining said closure member in a position closing the open front of said housing;
   h. said top wall has a depressed portion therein between said rear wall and the forwardly facing edge portion of said top wall and extending between said opposite side wall substantially parallel with the forwardly facing portion of said top wall;
   i. a handle is mounted on said top wall and positioned within said depressed portion; and
   j. a metal member is mounted on an inwardly facing surface of said panel of said closure member and cooperates therewith to define a compartment for refrigiration material for cooling the interior of the housing.

2. A food tray carrier as set forth in claim 1 wherein said metal member defining the compartment on the inwardly facing surface of said closure member comprises:
   a. a rear wall panel positioned in facing relation with the inwardly facing surface of said closure member panel;
   b. opposite side walls and a bottom wall extending from said rear wall panel to said closure member panel and substantially normal thereto; and
   c. a pair of flange portions each extending laterally from a respective one of said opposite side walls and positioned in engagement with the inwardly facing surface of said closure member panel.

3. A food tray carrier as set forth in claim 1 wherein:
   a. said closure member is molded to form a first outwardly open recess therein;
   b. a planar member is mounted on said closure member and partially covering the first recess in said closure member to define a handle on said closure member;
   c. said closure member is molded to form a second outwardly open recess therein; and
   d. said latch means is positioned in said second recess.

4. A food tray carrier comprising:
   a. a housing of molded plastic having a bottom wall and opposite side walls and a rear wall and a top wall defining an open front shell, said side walls and said bottom wall and said top wall being integral and each having a forwardly facing edge portion;
   b. means on said bottom wall and integral therewith engageable with a support surface for supporting said housing thereon;
   c. a plurality of elongated ribs integral with and extending inwardly from each of said opposite side walls, said ribs being arranged in vertically spaced and aligned pairs to define supports for peripheral side edges of food trays;
   d. generally U-shaped elongate metal framing members mounted on and enclosing said forwardly facing edge portion of each of said bottom wall and top wall and one of said side walls for substantially the respective lengths thereof to protect and strengthen same;

e. a closure member adapted to close the open front of said housing said closure member having a panel with peripheral side and top and bottom edges, said closure member panel having a flange portion extending from the peripheral top and bottom and one of the side edges thereof, said flange portions each being in facing relation with a respective one of said framing members when said closure member is in position closing the open front of said housing;

f. cooperating elongate metal members on each of said other side wall of the housing and other edge of said closure member panel to strengthen and stiffen same and hinge means connecting said elongate metal members to hingedly mount the closure member on said other side wall of the housing for movement between positions opening and closing the front of the housing;

g. latch means mounted on said closure member and engageable with said framing member on said one of said side walls for retaining said closure member in a position closing the open front of said housing;

h. said top wall has a depressed portion therein between said rear wall and the forwardly facing edge portion of said top wall and extending between said opposite side wall substantially parallel with the forwardly facing portion of said top wall;

i. a handle is mounted on said top wall and positioned within said depressed portion; and j. a metal member is mounted on an inwardly facing surface of said panel of said closure member and cooperates therewith to define a compartment for refrigeration material for cooling the interior of the housing.

5. A food tray carrier as set forth in claim 4 wherein the hinge mounting of said closure member on said other side wall members comprises an elongated piano-type hinge having as a first leaf thereof the elongate metal member secured to the forwardly facing edge portion of said other side wall member and as a second leaf thereof the elongate metal member secured to said closure member panel, said first leaf and said second leaf of said hinge extend substantially the full length of said other side wall member and said closure member respectively.

* * * * *